(12) United States Patent
Mondal et al.

(10) Patent No.: US 11,930,479 B2
(45) Date of Patent: Mar. 12, 2024

(54) PUCCH AND PDSCH IN MULTIPLEXED NR APPLICATIONS

(71) Applicant: Intel Corporation, Santa Clara, CA (US)

(72) Inventors: Bishwarup Mondal, San Ramon, CA (US); Gang Xiong, Beaverton, OR (US); Alexei Davydov, Nizhny Novgorod (RU); Avik Sengupta, San Jose, CA (US); Sergey Panteleev, Nizhny Novgorod (RU); Debdeep Chatterjee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 352 days.

(21) Appl. No.: 16/985,997

(22) Filed: Aug. 5, 2020

(65) Prior Publication Data

US 2020/0389897 A1    Dec. 10, 2020

Related U.S. Application Data

(60) Provisional application No. 62/888,376, filed on Aug. 16, 2019, provisional application No. 62/888,373, filed on Aug. 16, 2019.

(51) Int. Cl.
*H04W 72/0446* (2023.01)
*H04W 16/02* (2009.01)
(Continued)

(52) U.S. Cl.
CPC ....... *H04W 72/0446* (2013.01); *H04W 16/02* (2013.01); *H04W 72/1273* (2013.01); *H04W 72/23* (2023.01)

(58) Field of Classification Search
CPC ............ H04W 72/0446; H04W 16/02; H04W 72/042; H04W 72/1273; H04W 72/1289; H04L 5/0023; H04L 5/0044; H04L 5/0094; H04L 1/1887; H04L 1/1896; H04L 1/08; H04B 7/0617
See application file for complete search history.

(56) References Cited

U.S. PATENT DOCUMENTS

2020/0015200 A1* 1/2020 Vilaipornsawai ..... H04L 1/1819
2020/0077428 A1* 3/2020 Zhou ..................... H04W 72/23
(Continued)

*Primary Examiner* — Ricky Q Ngo
*Assistant Examiner* — Kabir U Jahangir
(74) *Attorney, Agent, or Firm* — Schwegman Lundberg & Woessner, P.A.

(57) ABSTRACT

Systems and methods for transmission of PDSCH and HARQ-ACK feedback in 5G networks are described. The TDRA of PDSCH repetitions are indicated in a DCI by a SLIV sequence configuration that contains multiple SLIV sequences. Each SLIV sequence for a slot is associated with an independent repetition factor and may also be associated with a partition factor to indicate a partition within the slot. One or more TRPs may be used to transmit each PDSCH repetition. The TCI states are mapped to the PDSCH repetitions in a round-robin fashion using an offset in terms of number of PDSCH repetitions from where TCI state switching starts and a number of consecutive PDSCH repetitions per TCI state. The HARQ-ACK bits in response to the PDSCH from the TRPs are concatenated in order of increasing control resource set higher layer signaling index.

14 Claims, 13 Drawing Sheets

(51) Int. Cl.
*H04W 72/1273* (2023.01)
*H04W 72/23* (2023.01)

(56) References Cited

U.S. PATENT DOCUMENTS

| | | | | |
|---|---|---|---|---|
| 2020/0367208 | A1* | 11/2020 | Khoshnevisan | H04L 5/1469 |
| 2021/0314954 | A1* | 10/2021 | Miao | H04W 72/0493 |
| 2022/0021499 | A1* | 1/2022 | Jiang | H04L 1/08 |
| 2022/0039073 | A1* | 2/2022 | Lee | H04L 1/0061 |
| 2022/0039136 | A1* | 2/2022 | Takeda | H04W 72/1289 |
| 2022/0095345 | A1* | 3/2022 | Chen | H04L 27/2607 |
| 2022/0158715 | A1* | 5/2022 | Bishwarup | H04W 76/19 |
| 2022/0239448 | A1* | 7/2022 | Gao | H04L 1/08 |
| 2022/0312466 | A1* | 9/2022 | Matsumura | H04L 5/0053 |

\* cited by examiner

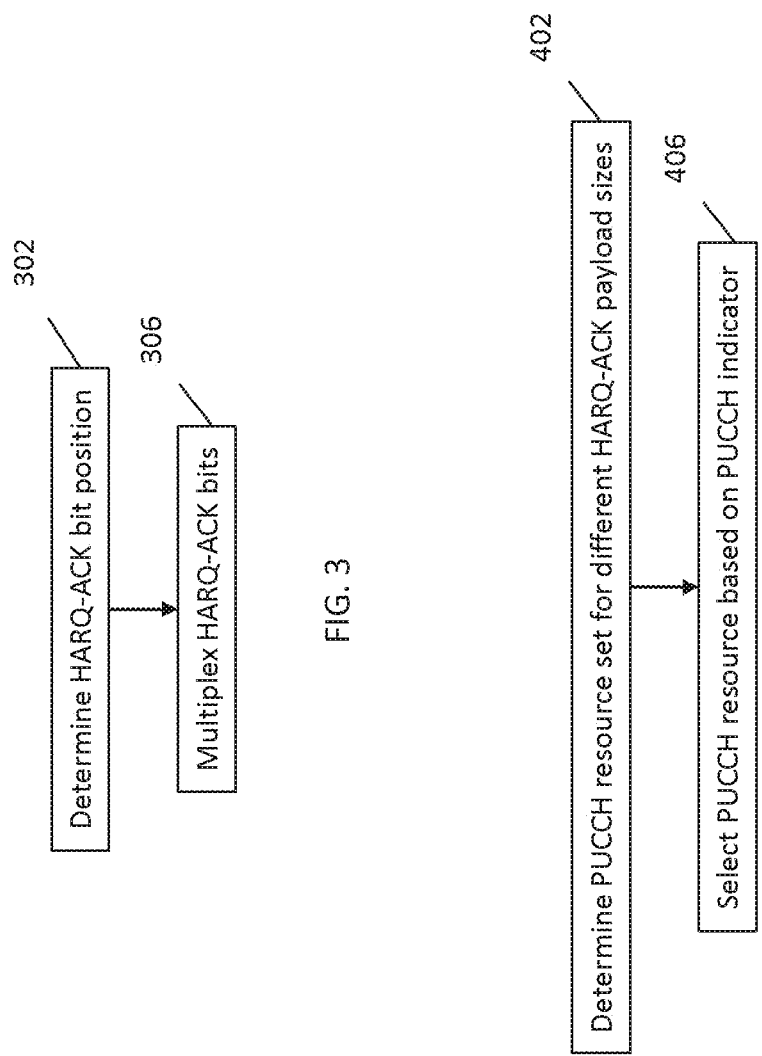

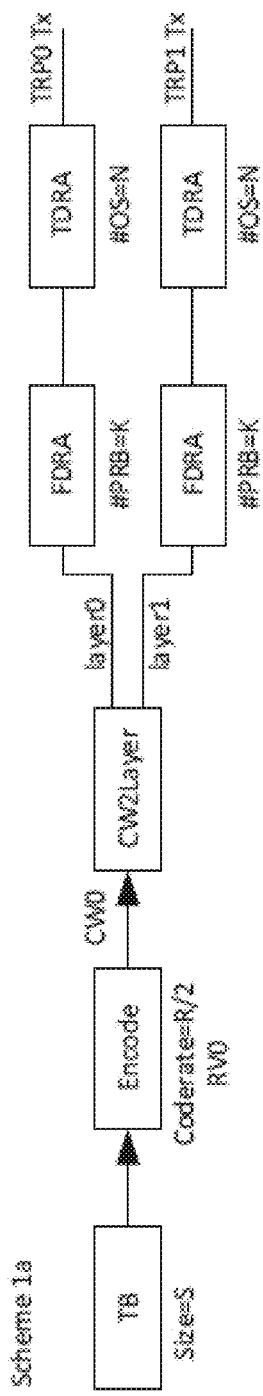
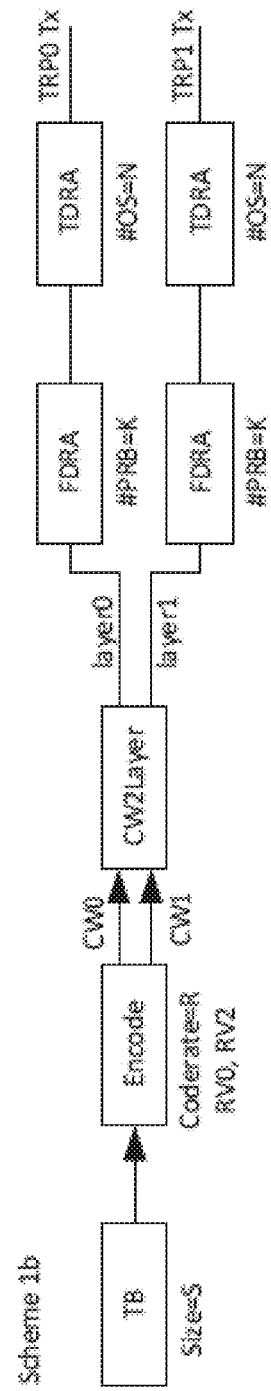
FIG. 5A
FIG. 5B

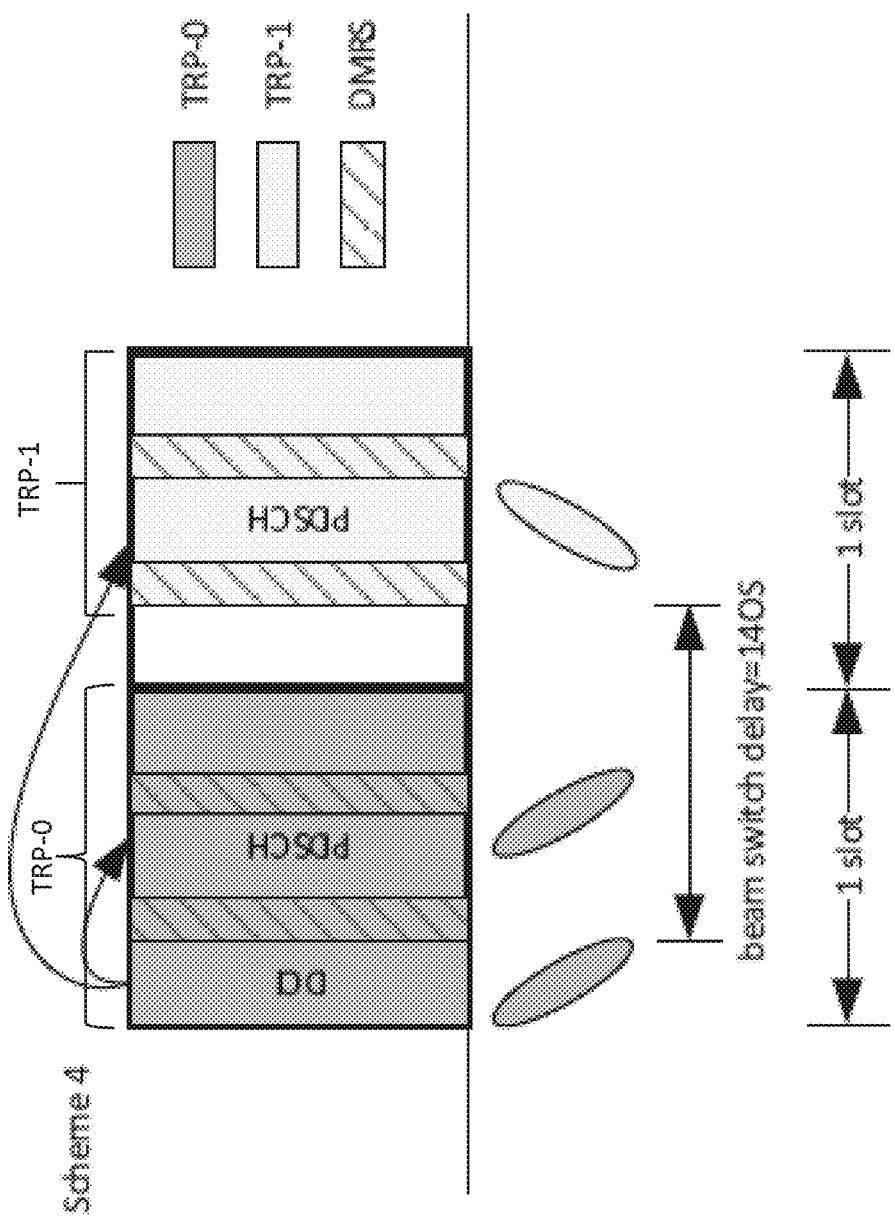

PUCCH AND PDSCH IN MULTIPLEXED NR APPLICATIONS

PRIORITY CLAIM

This application claims the benefit of priority under 35 U.S.C. 119(e) to U.S. Provisional Patent Application Ser. No. 62/888,373, filed Aug. 16, 2019, and U.S. Provisional Patent Application Ser. No. 62/888,376, filed Aug. 16, 2019, each of which is incorporated herein by reference in its entirety.

TECHNICAL FIELD

Embodiments pertain to uplink and downlink multiplexing multiple transmission/reception points (TRPs) in new radio (NR) or fifth generation (5G) systems. Some embodiments relate to hybrid automatic repeat request acknowledge (HARQ-ACK) multiplexing, physical uplink control channel (PUCCH) resource determination, and downlink assignment index (DAI) application for joint HARQ-ACK feedback. Some embodiments relate to time-domain resource allocation method for physical downlink shared channel (PDSCH) repetitions in multiplexing scenarios.

BACKGROUND

The use of 3GPP networks has increased due to both an increase in the types of devices user equipment (UEs) using network resources as well as the amount of data and bandwidth being used by various applications, such as video streaming, operating on these UEs. The 5G network, which like previous generations of networks includes both a radio-access network (RAN) and a core network (CN), has been developed to answer the enormous increase in number and diversity of communication devices. The advent of the increased flexibility provided by 5G systems, has engendered a host of issues, in particular when multiplexing is used with different TRPs.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 3 illustrates a method of multiplexing HARQ-ACK feedback in accordance with some embodiments.

FIG. 4 illustrates a method of providing a PUCCH resource in accordance with some embodiments.

FIG. 5A illustrates a first alternative of a first multi-TRP scheme in accordance with some embodiments.

FIG. 5B illustrates a second alternative of a first multi-TRP scheme in accordance with some embodiments.

FIG. 6B illustrates PDSCH repetitions in the multi-TRP scheme shown in FIG. 5F in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
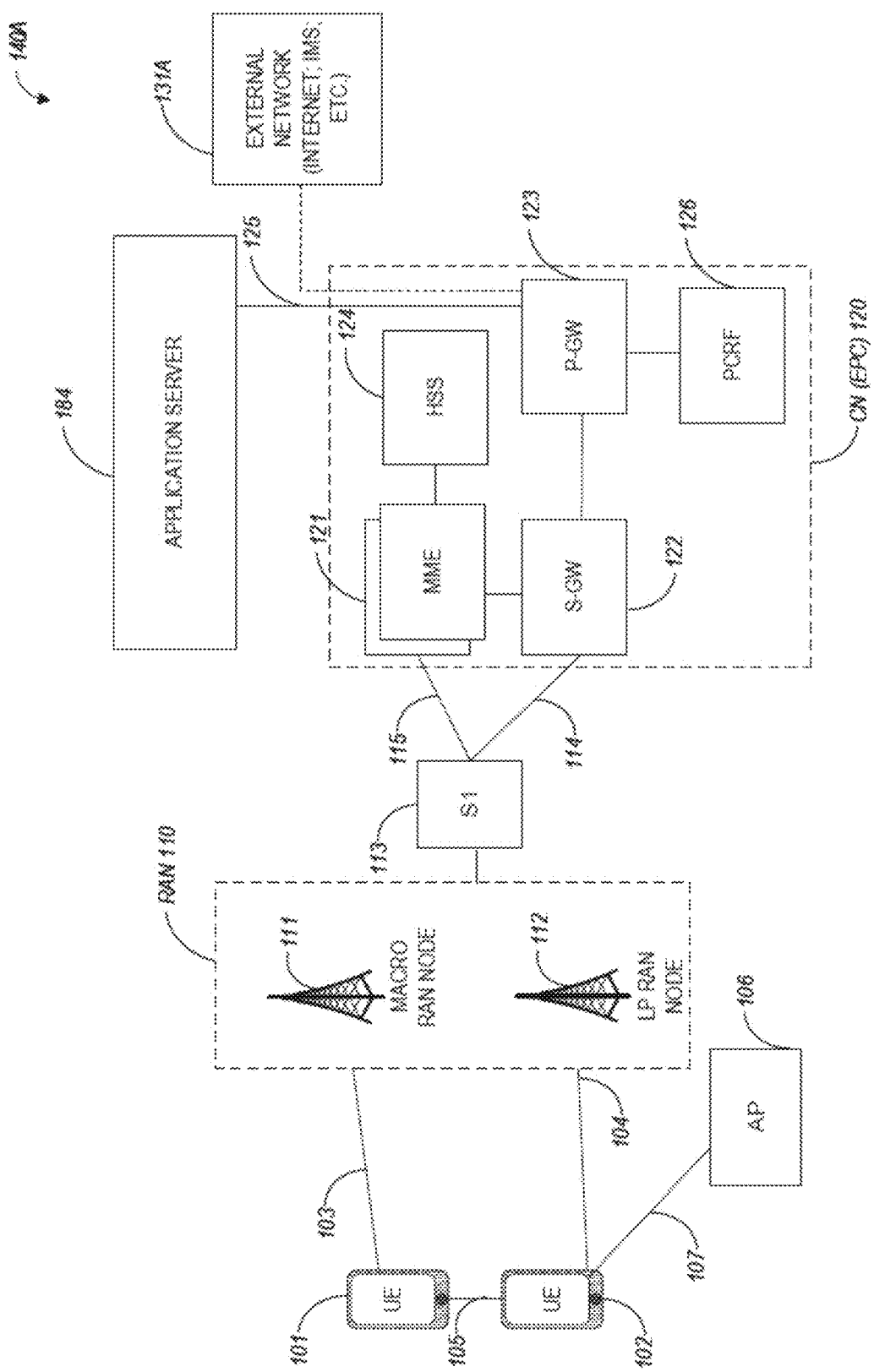
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or OFDM modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
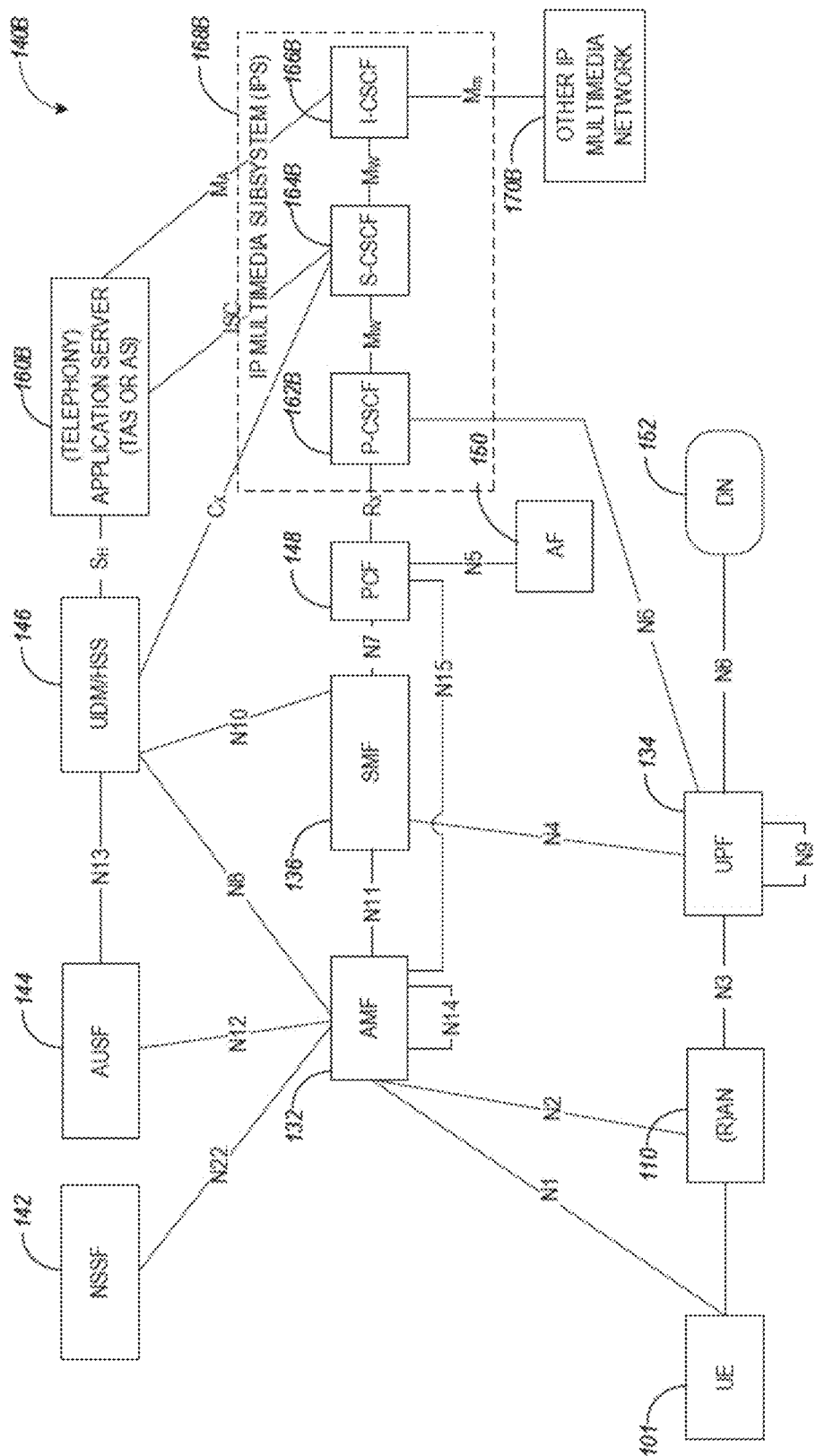
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
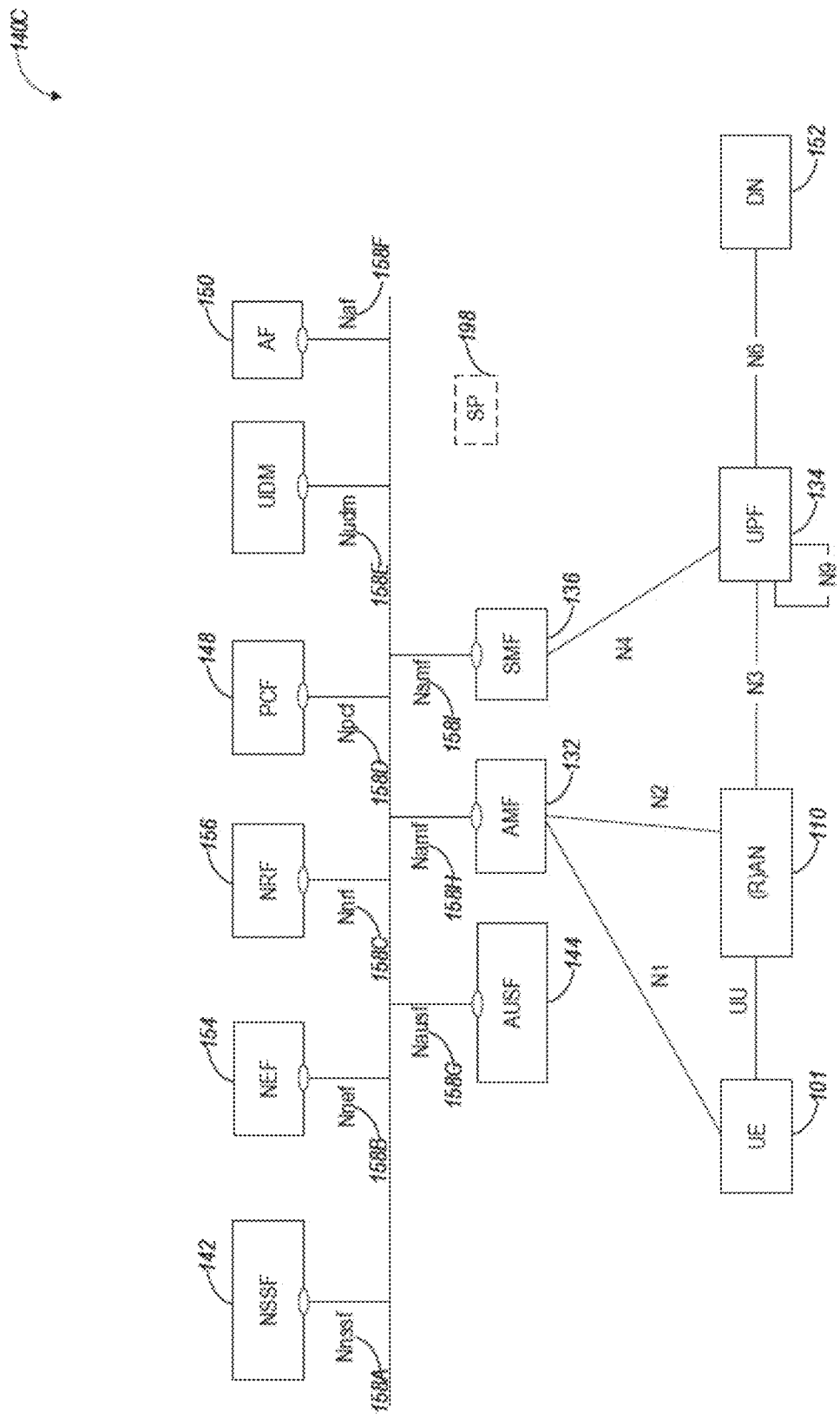
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
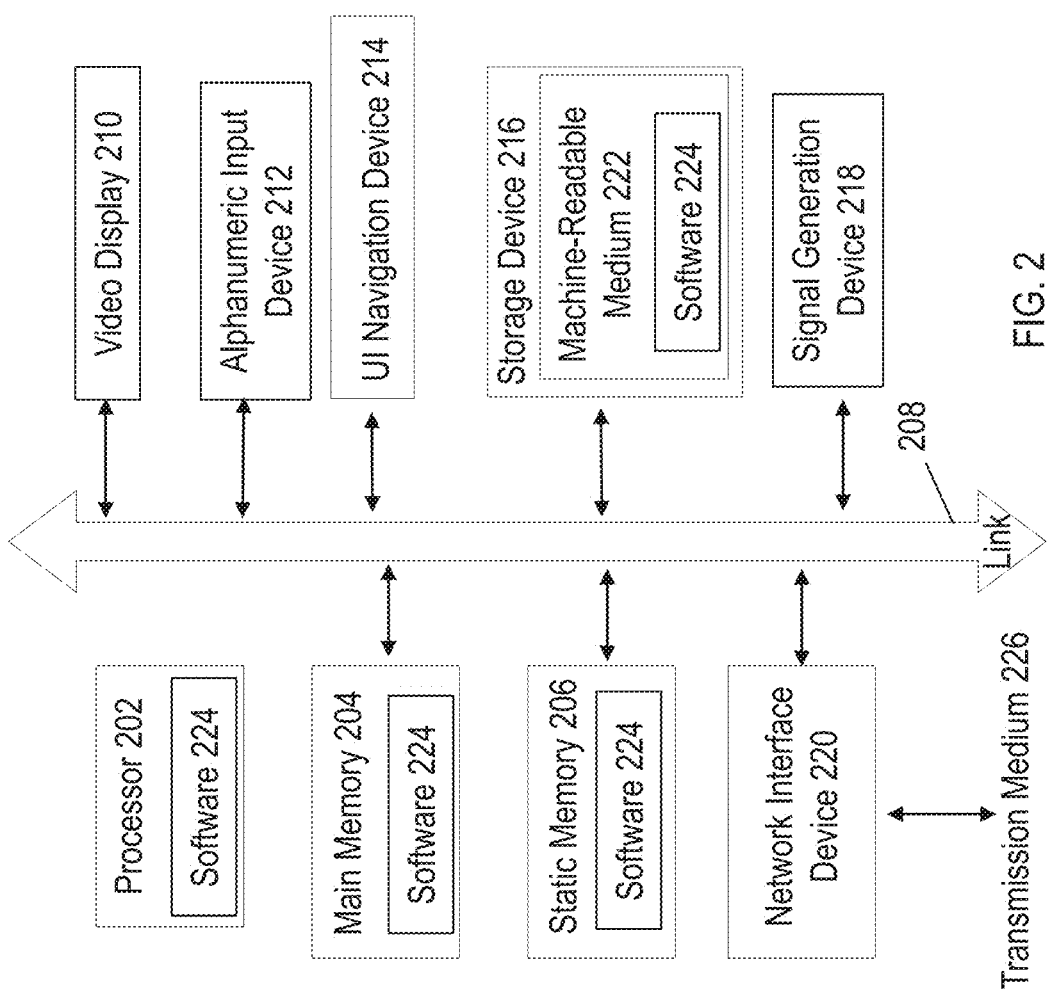
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

As indicated above, multiplexing in 5G systems have a number of features that continue to be under development, including the signaling and multiplexing of HARQ-ACK bits using multiple TRPs (TRP-0 and TRP-1, for example), PUCCH resource determination, and downlink assignment index (DAI) for joint HARQ-ACK feedback. Although the HARQ-ACK bits for TRP-0 and TRP-1 may be generated separately, the HARQ-ACK bits may be concatenated using the increasing order of configured higher layer signaling indices of CORESETs (TRP-id). In some embodiments, if ambiguity exists between the Downlink Control Information (DCIS), the TRP-id may be used to differentiate which one of the two DCIS is the last DCI. In some embodiments, a DAI application per TRP may be used for joint HARQ-ACK feedback.

HARQ-ACK Bit Multiplexing

In some embodiments, a UE may determine the position of HARQ-ACK bits (for a semi-static codebook) based on a pseudo-code. If the UE is configured with a semi-static HARQ-ACK codebook, the codebook may remain valid for a number of slots indicated by RRC signaling. This is different from a dynamic codebook, in which the DAI of the PDCCH may indicate how many transport blocks (TBs) or codeblock groups to report. The UE may determine, corresponding to the PUCCH in a particular slot, a set of occasions for candidate PDSCH receptions or semi-persistent signalling (SPS) PDSCH releases dependent on the pseudo-code. This pseudo-code may remain the same for separate HARQ-ACK feedback. If the HARQ-ACK bits for TRP-0 and TRP-1 are concatenated in the order of the TRP indices, then the same pseudo-code can be maintained, minimizing the impact to the existing standard. Accordingly, in embodiments in which the HARQ-ACK bits for TRP-0 and TRP-1 are generated separately, the HARQ-ACK bits may be concatenated using the increasing order of configured higher layer signaling indices of the Control Resource Sets (CORESETs) (TRP-id). The CORESET parameters may include resource element (RE) (1 subcarrier×1 OFDM symbol), resource element group (REG) (1RB=12 REs×1 OFDM symbol), REG bundles (multiple REGs), Control Channel Element (CCE) (multiple REGs), Aggregation level (number of CCEs allocated per PDCCH −1/2/4/8/16).

Such an embodiment is shown in FIG. 3, which illustrates a method of multiplexing HARQ-ACK feedback in accordance with some embodiments. As shown, at operation 302, a position of the HARQ-ACK bits to be transmitted is determined by processing circuitry in the UE based on the pseudo-code. At operation 304 the HARQ-ACK bits are multiplexed for TRP-0 and TRP-1.

PUCCH Resource Determination

FIG. 4 illustrates a method of providing a PUCCH resource in accordance with some embodiments. To determine the PUCCH carrying the HARQ-ACK feedback, at operation 402 a UE may first determine the PUCCH resource set. The PUCCH resource set may be based on a payload size of HARQ-ACK feedback.

At operation 404, the UE may subsequently select the PUCCH resource to use from the PUCCH resource set. The PUCCH resource may be selected according to the PUCCH resource indicator of the last DCI and/or the starting CCE index of the corresponding PDCCH transmission. The last DCI may be determined in a frequency first and time second manner, e.g., detected DCI formats may first be indexed in an ascending order across serving cells indexes and then indexed in an ascending order across PDCCH monitoring occasion indexes.

If two downlink (DL) DCIs (from TRP-0 and TRP-1) share the same time location within a slot, in order to avoid ambiguity between the gNB and the UE on the determination of PUCCH resource carrying the HARQ-ACK feedback, the TRP-id can be used to differentiate which one of the two DCIs is the last DCI. This may relieve the network from coordinating the Primary Rate Interfaces (PRIs) dynamically. Thus, some embodiments may use the TRP-id to differentiate which one of the two DCIs is the last DCI if there is ambiguity. The last DCI may be, for example, the DCI associated with the lowest TRP-id.

DAI application

When a dynamic HARQ-ACK codebook is used, different embodiments may be used. In one embodiment, the DAI may be applied per TRP or may be applied across multiple TRPs. For separate HARQ-ACK feedback, the DAI may be applied per TRP. Further, if the DAI is applied across TRPs, then the network may coordinate DAI information across the TRPs for every mini-slot and CC scheduling. Accordingly, for joint HARQ-ACK feedback, DAI application per TRP may be used (the PDCCH for each TRP has a DAI).

Turning from uplink HARQ-ACK feedback to downlink transmissions, one different between 5G networks and previous generations of networks is that the scheduling in the previous generations is subframe-based, whereas scheduling in 5G networks may include symbol-based scheduling within a particular subframe. To enable this, the SLIV provided in the PDSCH-TimeDomainResourceAllocation-List (or PUSCH-TimeDomainResourceAllocationList) information element (IE) in Radio Resource Control (RRC) signaling may be used to define the start symbol and the number of consecutive symbols for PDSCH allocation using a single number. However, RRC signaling alone may be insufficient to handle the flexibility for 5G networks. This leads to methods of determining the SLIV configuration and of dynamically indicating a SLIV sequence to use for a Time Domain Resource Allocation (TDRA) in the DCI carried by a PDCCH (in addition to the RRC signaling).

Accordingly, in various embodiments, time-domain resource allocation for PDSCH repetitions is disclosed, as is a mechanism to map Transmission Configuration Indicator (TCI) states to the PDSCH repetitions. Configurations of multiple SLIV sequences and dynamic indication of the SLIV sequence for TDRA including the repetition factor (number of repetitions) using the DCI are disclosed. This permits mapping of the TCI states to PDSCH repetitions in a round-robin fashion (each having the same number of the PDSCH repetitions and advancing from one TCI state to the next TCI state until all TCI states have been used before returning to the first TCI state) while defining an offset (in terms of the number of repetitions) from where TCI state switching starts and the number of consecutive PDSCH repetitions per TCI state. The embodiments may allow the gNB to allocate PDSCH repetitions with low latency and within a latency budget as well as use of multiple TRPs for PDSCH repetitions.

Note that unlike coverage enhancements in ultra-reliable and low latency case (URLLC), high repetition factors are not expected but latency constraints may lead to allocation flexibility. For PDSCH repetition, the described embodiments may reduce the alignment delay from PDSCH ready to PDSCH transmission, take benefit of increased PDCCH monitoring occasions within a slot based on 3-5a, 3-5b and Rel-16 URLLC WID enhancements, take benefit of existing Type B lengths and potentially increased granularity in Rel-16, be able to consider gaps around slot boundaries due to PDCCH/PUCCH, be able to consider beam-switching time from DCI indication to PDSCH allocation, be able to consider PDSCH processing time for a given latency budget. To this end a single SLIV and a repetition factor-based design (as in Rel-15) may not flexible enough.

Figure 5C:
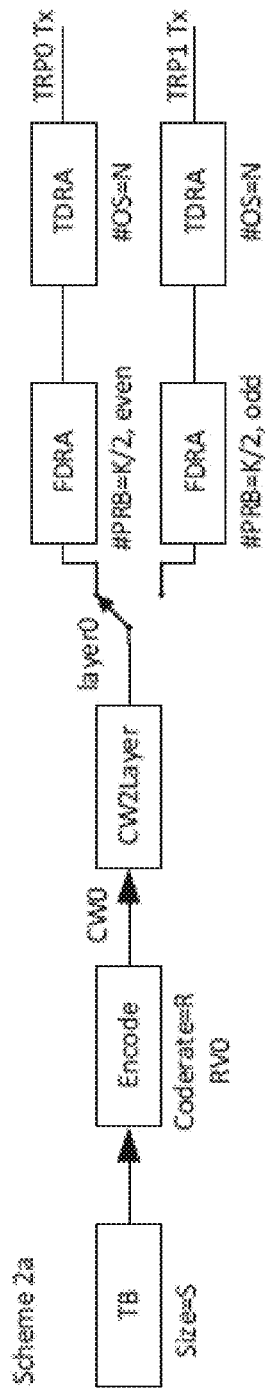
FIG. 5C illustrates a first alternative of a second multi-TRP scheme in accordance with some embodiments.
Figure 5D:
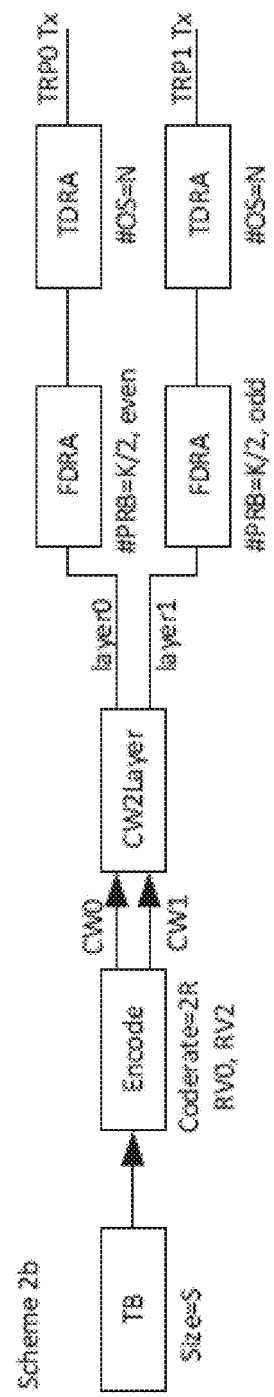
FIG. 5D illustrates a second alternative of a second multi-TRP scheme in accordance with some embodiments.
Figure 5E:
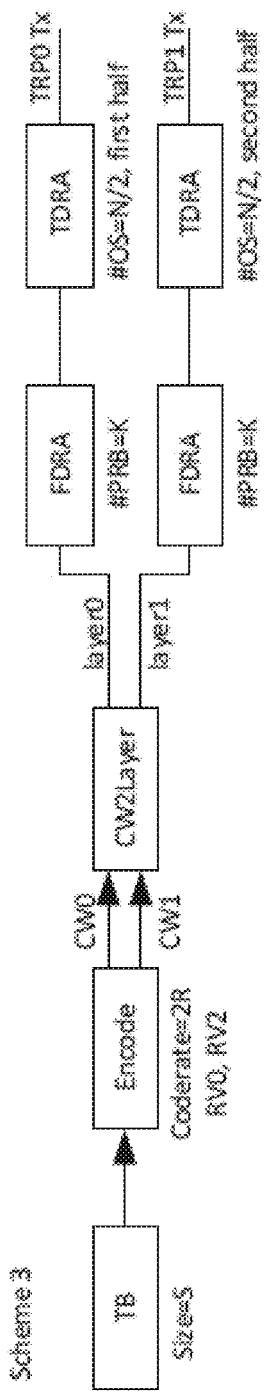
FIG. 5E illustrates a third multi-TRP scheme in accordance with some embodiments.
Figure 5F:
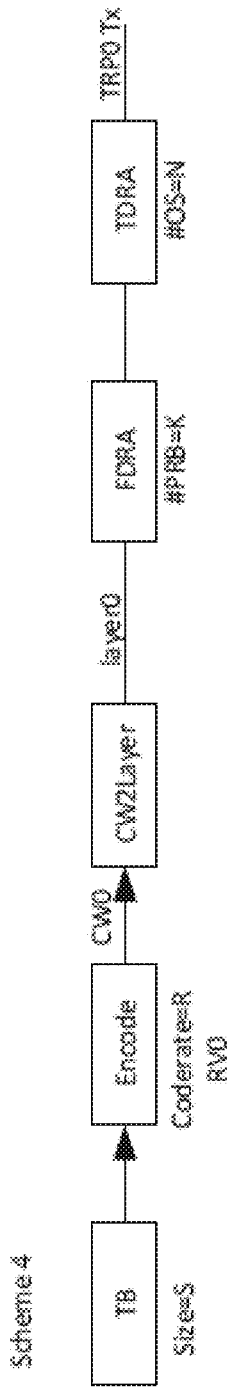
FIG. 5F illustrates a fourth multi-TRP scheme in accordance with some embodiments.
Figure 5G:
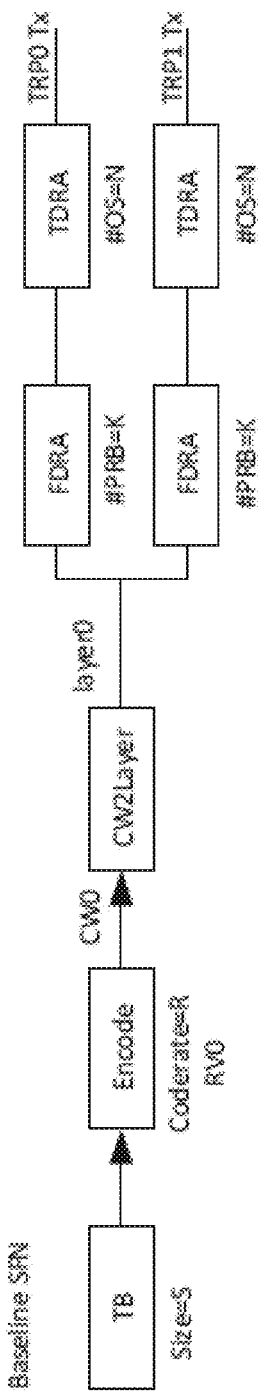
FIG. 5G illustrates a baseline multi-TRP scheme in accordance with some embodiments.

FIGS. 5A-5G describe multi-TRP schemes for PDSCH transmission. In particular, FIG. 5A illustrates a first alternative of a first multi-TRP scheme in accordance with some embodiments; FIG. 5B illustrates a second alternative of a first multi-TRP scheme in accordance with some embodiments; FIG. 5C illustrates a first alternative of a second multi-TRP scheme in accordance with some embodiments; FIG. 5D illustrates a second alternative of a second multi-TRP scheme in accordance with some embodiments; FIG. 5E illustrates a third multi-TRP scheme in accordance with some embodiments; FIG. 5F illustrates a fourth multi-TRP scheme in accordance with some embodiments; and FIG. 5G illustrates a baseline multi-TRP scheme in accordance with some embodiments. Each of FIGS. 5A-5G show several operations used for transmission of a PDSCH. In each of these figures, a transport block (TB) of size S is encoded using a code rate of R (FIGS. 5A, 5F, 5G) or 2R (FIGS. 5B-5E) and a Redundancy Version (RV) of 0 (FIGS. 5A-5G) or 2 (FIGS. 5B, 5C).

After encoding the TB, one or two codewords may be created for transmission by the TRPs. As shown, a single codeword is created in the scheme shown in FIGS. 5A, 5F, and 5G, while two codewords are created in the scheme shown in FIGS. 5B and 5C. The two codewords generated in the embodiments shown in FIGS. 5B and 5C may thus be half the size of the single codeword generated in the embodiments shown in FIGS. 5A, 5F, and 5G. The codeword(s), as shown, are then, among others, scrambled, mapped to modulation symbols and mapped to different MIMO layers (layer 0 for TRP-0, layer 1 for TRP-1) at the operation labeled CW2Layer in FIGS. 5A-5G.

The resources are then selected for each TRP using frequency domain resource allocation (FDRA) and time domain resource allocation (TDRA) operations. As shown in FIG. 5A, FDRA and TDRA is selected for each layer, with each layer being allocated K PRBs in frequency and N OFDM symbols (OSs) in the same slot. Thus, in FIG. 5A each TRP may transmit its individual PDSCH using overlapping frequency and time resources.

The embodiment shown in FIG. 5B is similar to that shown in FIG. 5A: each layer is allocated K PRBs in frequency and N OSs in the same slot and each TRP transmitting the same PDSCH using overlapping frequency and time resources. However, as above, the codewords generated are ½ the size of the codeword generated in the embodiment shown in FIG. 5A.

The embodiment shown in FIG. 5C is also similar to that shown in FIG. 5A. However, in this case, non-overlapping frequencies are allocated to the TRPs during transmission. Each layer is allocated K/2 PRBs in frequency and N OSs in the same slot. In particular, one of the TRPs (shown as TRP-0) is allocated even PRBs for transmission, while the other TRP (shown as TRP-1) is allocated odd PRBs for transmission. Each TRP is allocated the same time resources so that its individual PDSCH is transmitted over the same time resources but using different frequency resources.

The embodiment shown in FIG. 5D is similar to that shown in FIG. 5B. However, similar to the embodiment shown in FIG. 5C, non-overlapping frequencies are allocated to the TRPs during transmission in the embodiment shown in FIG. 5D. Thus, each layer is again allocated K/2 PRBs (even PRBs for TRP-0 and odd PRBs for TRP-1) in frequency and N OSs in the same slot. Each TRP is allocated the same time resources so that its individual PDSCH is transmitted over the same time resources but using different frequency resources.

The embodiment shown in FIG. 5E is also similar to that shown in FIGS. 5A and 5CD. However, in this case, while overlapping frequencies (K PRBs) are allocated to the TRPs during transmission, N/2 non-overlapping temporal resources in the same slot are allocated to the TRPs. In particular, one of the TRPs (shown as TRP-0) is allocated the first half of the OSs in the slot for transmission, while the other TRP (shown as TRP-1) is allocated the second half of the OSs in the slot for transmission. Each TRP thus transmits its individual PDSCH over the same frequency resources but using different time resources.

Figure 6A:
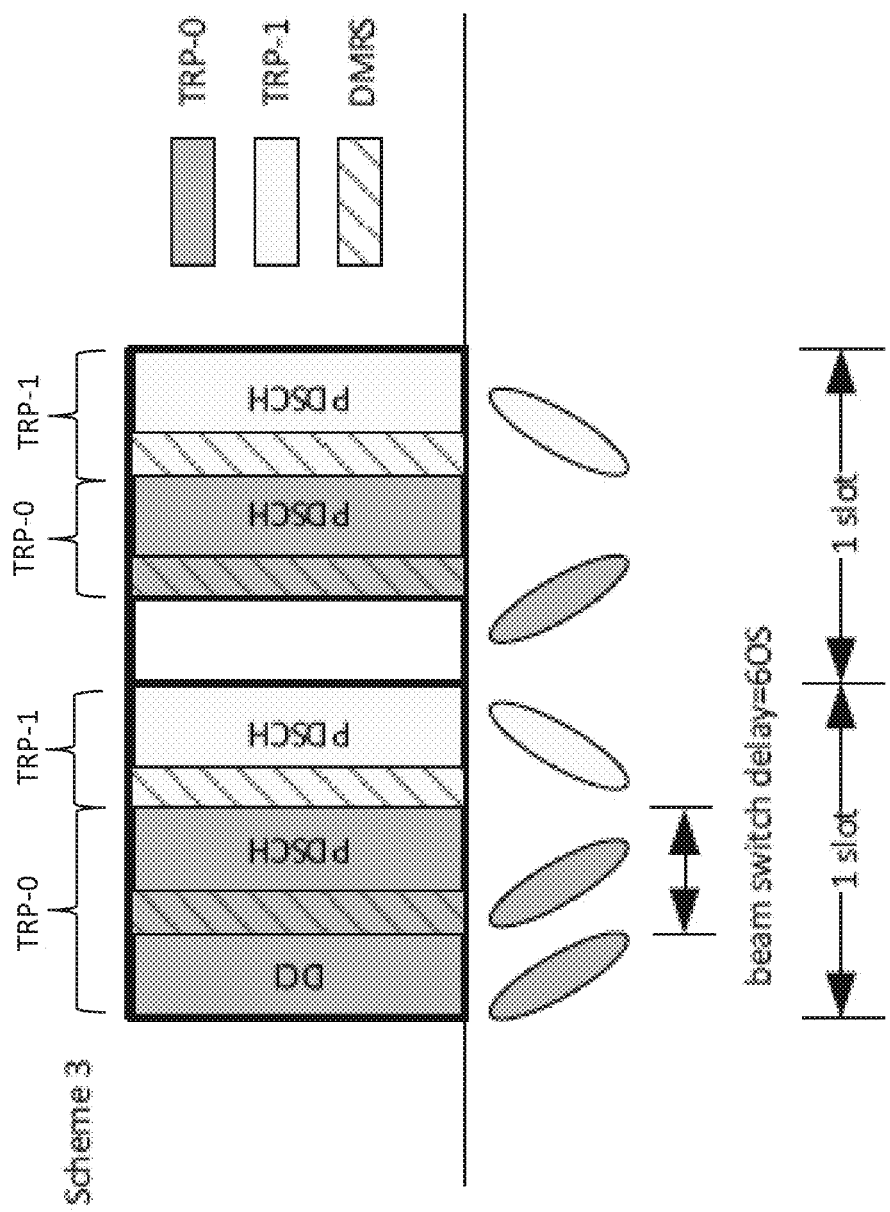
FIG. 6A illustrates PDSCH repetitions in the multi-TRP scheme shown in FIG. 5E in accordance with some embodiments.

FIG. 6A illustrates PDSCH repetitions in the multi-TRP scheme shown in FIG. 5E in accordance with some embodiments. As shown in FIG. 6A, the PDSCH transmitted by the TRP-0 and TRP-1 occupy the same frequency but are transmitted in a first and second portion, respectively, of each slot. The DCI may be transmitted in the first slot of the subframe, followed by Demodulation Reference Signals (DMRS) and PDSCH, all transmitted by the TRP-0. TRP-1 may then transmit the DMRS and PDSCH within the same slot. It may take a substantial amount of time (6 OSs) to switch the beam transmission between TRP-0 and TRP-1. DMRS and PDSCH transmission in second slot may replicate the frequency and timing of these transmissions in the first slot. As shown, there are 4 PDSCH repetitions (2 each by the TRP-0 and TRP-1) with 4 OFDM symbols for each PDSCH repetition.

The embodiment shown in FIG. 5F is also similar to that shown in FIG. 5A. However, in this case, the transmission is provided by a single TRP but replicated over adjacent slots (e.g., slot n, n+1). FIG. 6B illustrates PDSCH repetitions in the multi-TRP scheme shown in FIG. 5F in accordance with some embodiments. As shown in FIG. 6B, the PDSCH transmitted by the TRP-0 and TRP-1 occupy the same frequency but are transmitted in a first and second slot of the subframe, respectively. The DCI may be transmitted in the first slot, followed by DMRS and PDSCH, all transmitted by the TRP-0. Beam transmission switching between TRP-0 and TRP-1 may occur over 14 OSs. As shown, there are 2 PDSCH repetitions with 8 OFDM symbols for each PDSCH repetition in FIG. 6B. As above, different SLIV sequence configurations (including repetitions) and TCI mapping may be configured to the UE using RRC signaling. The DCI may then indicate one of the sequences to use using 2 bits.

Only a single codeword is generated in the embodiment shown in the baseline embodiment of FIG. 5G. In this embodiment, the same scrambled/mapped codeword is provided for both TRPs. In addition, the same FDRA and TDRA is selected for each TRP. Thus, in FIG. 5G each TRP may transmit the same PDSCH using overlapping frequency and time resources.

SLIV Sequence Design

Figure 7A:
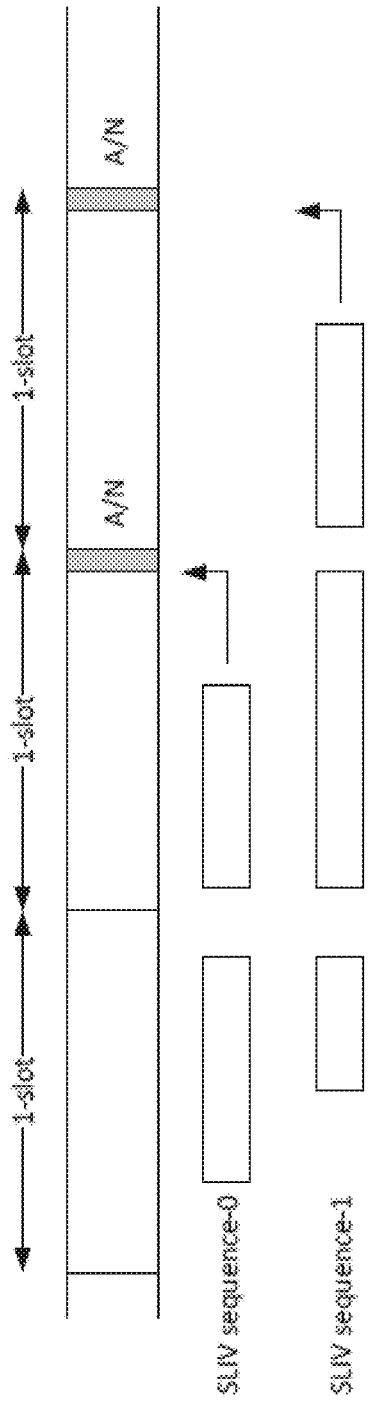
FIG. 7A illustrates frequency range 1 (FR1) for a start and length indicator (SLIV) sequence design in accordance with some embodiments.
Figure 7B:
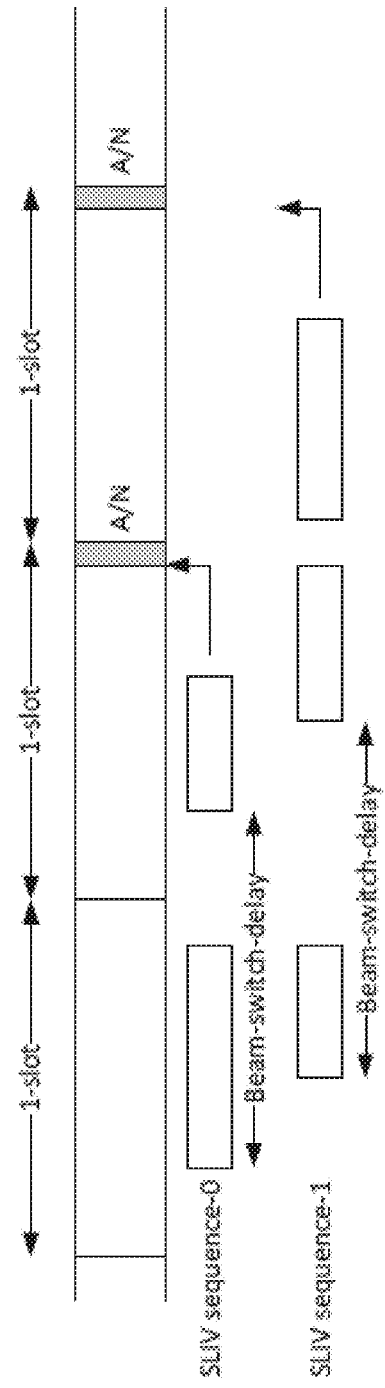
FIG. 7B illustrates FR2 for a SLIV sequence design in accordance with some embodiments.

FIG. 7A illustrates frequency range 1 (FR1) for a SLIV sequence design in accordance with some embodiments. FIG. 7B illustrates FR2 for a SLIV sequence design in accordance with some embodiments. Thus, FIGS. 7A and 7B illustrate different configuration of multiple SLIV sequences and re-using (up to) 4-bit TDRA bits to dynamically indicate a SLIV sequence in different frequency ranges (FR1 and FR2). As shown, different SLIV sequences (SLIV sequence-0, SLIV sequence-1) may have different sizes and/or start points within a particular slot. The SLIV may be the same or may be different, as shown, in each slot. For example, the PDSCH repetition length may be different in each of slot 1 and 2 (and 3 for SLIV sequence-1). The starting point in slot 1 of FIG. 7A may occur before the relative starting point in slot 2, thereby minimizing the time to transmit the HARQ-ACK feedback (which may be, as shown, at the end of slot 2 for SLIV sequence-0 and at the end of slot 3 for SLIV sequence-1). FIG. 7B may also incorporate a bean switch delay between repetitions in different slots.

For slot-level repetition (shown in FIG. 5F, for example), each slot may correspond to a single SLIV, which can be referenced with respect to the slot boundary (as in Rel-15). Construction of a SLIV sequence could be SLIV sequence: =(SLIV-1, rep-1), (SLIV-2, rep-2), (SLIV-3, rep-3), where rep-1, rep-2, rep-3 are repetition factors. (rep-1+rep-2+rep-3) may determine the total number of repetitions of the TB.

Some of the repetition factors may be dynamically modified. In some embodiments, a nominal configured value may be used for the repetition factor in the RRC signaling. In this case, a +/− delta value to the nominal repetition value can be dynamically indicated in the DCI for each SLIV in the selected SLIV sequence.

In the case of sub-slot level repetition (e.g. shown in FIG. 5E, for example), representing a sub-slot by a Rel-15 6-bit SLIV may be inefficient as a 6-bit SLIV is used for representing all combinations of S, L in a 14-symbol slot. Therefore, it may be beneficial to retain TDRA design for slot-aggregation and additionally indicate SLIV partitions using a separate parameter. Gaps between repetitions within a slot may or may not be accommodated. In that case indicating a partition may simply be added as an enhanced SLIV sequence: =(SLIV-1, a, rep-1), (SLIV-2, a, rep-2), (SLIV-3, a, rep-3) where partition $\alpha \in [0, \frac{1}{2}]$—i.e., when $\alpha=\frac{1}{2}$, different SLIVs may be present in a single slot. Note that a partition of Type-A SLIV may represent a Type-B allocation (and consequently DMRS determination) in this case.

K0 and Type-A/B indication is associated to each SLIV as in Rel-15 for the scheme shown in FIG. 5F. For sub-slot level repetition (the scheme shown in FIG. 5E) a Type-A/B may be determined based on the starting symbol and length of the partition.

Mapping of TCI states to repetitions (e.g., for schemes shown in FIGS. 5E and 5F)

In terms of mapping TCI states (indicated in the DCI) to repetitions, in some embodiments, approximately the same number of repetitions may be mapped to each TCI state. One method for mapping the TCI states indicated in the DCI to the transmission occasions can be round-robin. In this case, a mechanism may be used for the UE to assume a default TCI state for all repetitions starting before the beam-switching delay. At the same time, full flexibility of configuring each repetition with TCI state may lead to excessive signaling overhead. An example of limited flexibility for mapping TCI state to repetitions could be to configure both an offset (in terms of the number of repetitions) from where TRP switching starts and the number of consecutive repetitions per TRP.

Figure 8:
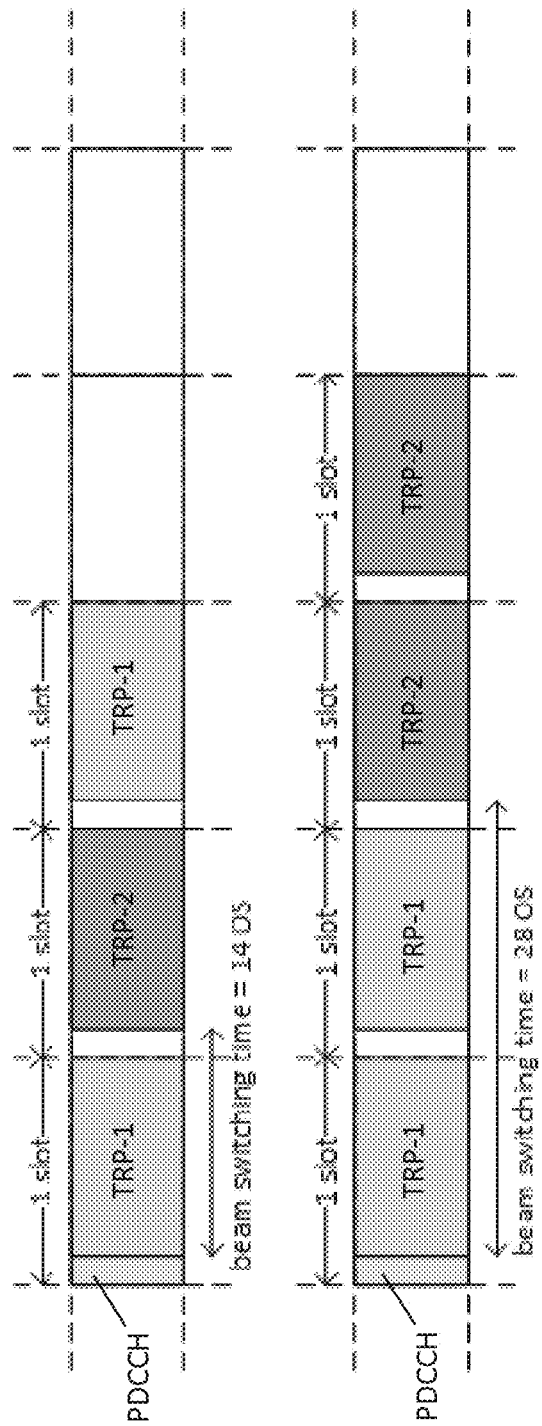
FIG. 8 illustrates Transmission Configuration Indicator (TCI) state mapping in accordance with some embodiments.

FIG. 8 illustrates Transmission Configuration Indicator (TCI) state mapping in accordance with some embodiments. Two different TRPs may transmit the PDSCH on the slots associated with a PDCCH. In the upper portion of FIG. 8, the TRPs alternate PDSCH transmission in adjacent slots, while in the lower portion of FIG. 8, each TRP may transmit in multiple adjacent slots before alternating with the other TRP. The pattern of TRP transmission may depend on the beam switching time constraints (e.g., 14 OSs in the upper portion and 28 OSs in the lower portion). Due to different beam switching time constraints, some configurability is beneficial for mapping the TCI states to the PDSCH repetition. As shown, a set of 1 or 2 consecutive PDSCH repetitions may be assigned to the same TRP. Accordingly, TCI states may be mapped to PDSCH repetitions in a round-robin fashion while defining an offset (in terms of the number of repetitions) from where TCI state switching starts and the number of consecutive repetitions per TCI state.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Thus, at least one of A or B, includes one or more of A, one or more of B, or one or more of A and one or more of B. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of a $5^{th}$ generation NodeB (gNB), the apparatus comprising:
    processing circuitry to configure the gNB to:
        transmit, to a user equipment (UE), a time-domain resource allocation list having a time-domain configuration for a physical downlink shared channel (PDSCH) allocation having a number of PDSCH transmission occasions for a slot-based repetition scheme;
        transmit, to the UE, a physical downlink control channel (PDCCH) having downlink control information (DCI) that indicates a first and second Transmission Configuration Indicator (TCI) state for the PDSCH allocation, the PDSCH allocation having more than two PDSCH transmission occasions, the first TCI state applied to a first PDSCH transmission occasion of a set of PDSCH transmission occasions across consecutive slots of the PDSCH allocation and the second TCI state applied to a second PDSCH transmission occasion of the set of PDSCH transmission occasions, the PDCCH associated with a coreset pool index;
        transmit, to the UE, a PDSCH in the first and second PDSCH transmission occasions;
        continue to transmit, until the number of PDSCH transmission occasions is reached, the PDSCH in a sequential mapping pattern to alternate multiple first PDSCH transmission occasions in a first set of consecutive slots with multiple second PDSCH transmission occasions in a second set of consecutive slots such that the first TCI state is in the first set of consecutive slots and the second TCI state is in the second set of consecutive slots; and
        receive, from the UE in response to the PDSCHs, at least one physical uplink control channel (PUCCH) containing hybrid automatic repeat request acknowledgement (HARQ-ACK) information bits having a position dependent on the coreset pool index; and
    memory configured to store the DCI.

2. The apparatus of claim 1, wherein the processing circuitry further configures the gNB to transmit Radio Resource Control (RRC) signalling containing the time-domain resource allocation list.

3. The apparatus of claim 2, wherein the RRC signalling contains a plurality of time-domain configurations.

4. The apparatus of claim 1, wherein the DCI is further configured to indicate application of a same start and length indicator (SLIV) for the set of PDSCH transmission occasions.

5. The apparatus of claim 1, wherein the processing circuitry further configures the gNB to:
  transmit PDCCHs that schedule time-overlapped PDSCHs, the PDCCHs associated to different CORESETs having different CORESET Pool Index values; and
  receive, from the UE, a PUCCH containing HARQ-ACK information bits that are concatenated based on the coreset pool index.

6. A non-transitory computer-readable storage medium that stores instructions for execution by one or more processors of a 5$^{th}$ generation NodeB (gNB), the instructions when executed configure the one or more processors to configured the gNB to:
  transmit, to a user equipment (UE), a time-domain resource allocation list having a time-domain configuration for a physical downlink shared channel (PDSCH) allocation indicating a number of PDSCH transmission occasions for a slot-based repetition scheme;
  transmit, to the UE, a physical downlink control channel (PDCCH) having downlink control information (DCI) that indicates a first and second Transmission Configuration Indicator (TCI) state for the PDSCH allocation, the PDSCH allocation having more than two PDSCH transmission occasions, the first TCI state applied to a first PDSCH transmission occasion of a set of PDSCH transmission occasions across consecutive slots of the PDSCH allocation and the second TCI state applied to a second PDSCH transmission occasion of the set of PDSCH transmission occasions, the PDCCH associated with a coreset pool index;
  transmit, to the UE, a PDSCH in the first and second PDSCH transmission occasions;
  continue to transmit, until the number of PDSCH transmission occasions is reached, the PDSCH in a sequential mapping pattern to alternate multiple first PDSCH transmission occasions in a first set of consecutive slots with multiple second PDSCH transmission occasions in a second set of consecutive slots such that the first TCI state is in the first set of consecutive slots and the second TCI state is in the second set of consecutive slots; and
  receive, from the UE in response to the PDSCHs, at least one physical uplink control channel (PUCCH) containing hybrid automatic repeat request acknowledgement (HARQ-ACK) information bits having a position dependent on the coreset pool index.

7. The medium of claim 6, wherein the instructions when executed configure the gNB to transmit Radio Resource Control (RRC) signalling containing the time-domain resource allocation list.

8. The medium of claim 7, wherein the RRC signalling contains a plurality of time-domain configurations.

9. The medium of claim 7, wherein the instructions when executed further configure the gNB to:
  transmit PDCCHs that schedule time-overlapped PDSCHs, the PDCCHs associated to different CORESETs having different CORESET Pool Index values; and
  receive, from the UE, a PUCCH containing HARQ-ACK information bits that are concatenated based on the coreset pool index.

10. The medium of claim 6, wherein the DCI is further configured to indicate application of a same start and length indicator (SLIV) for the set of PDSCH transmission occasions.

11. An apparatus of a user equipment (UE), the apparatus comprising:
  processing circuitry to configure the UE to:
  receive, from a 5$^{th}$ generation NodeB (gNB), a time-domain resource allocation list having a time-domain configuration for a physical downlink shared channel (PDSCH) allocation indicating a number of PDSCH transmission occasions for a slot-based repetition scheme;
  receive, from the gNB, a physical downlink control channel (PDCCH) having downlink control information (DCI) that indicates a first and second Transmission Configuration Indicator (TCI) state for the PDSCH allocation, the PDSCH allocation having more than two PDSCH transmission occasions, the first TCI state applied to a first PDSCH transmission occasion of a set of PDSCH transmission occasions across consecutive slots of the PDSCH allocation and the second TCI state applied to a second PDSCH transmission occasion of the set of PDSCH transmission occasions, the PDCCH associated with a coreset pool index;
  receive, from the gNB, a PDSCH in the first and second PDSCH transmission occasions;
  continue to receive, until the number of PDSCH transmission occasions is reached, the PDSCH in a sequential mapping pattern to alternate multiple first PDSCH transmission occasions in a first set of consecutive slots with multiple second PDSCH transmission occasions in a second set of consecutive slots such that the first TCI state is in the first set of consecutive slots and the second TCI state is in the second set of consecutive slots; and
  transmit, to the UE in response to the PDSCHs, at least one physical uplink control channel (PUCCH) containing hybrid automatic repeat request acknowledgement (HARQ-ACK) information bits having a position dependent on the coreset pool index; and
  memory configured to store the DCI.

12. The apparatus of claim 11, wherein the processing circuitry further configures the UE to receive Radio Resource Control (RRC) signalling containing the time-domain resource allocation list, the RRC signalling containing a plurality of time-domain configurations.

13. The apparatus of claim 11, wherein the DCI is further configured to indicate application of a same start and length indicator (SLIV) for the set of PDSCH transmission occasions.

14. The apparatus of claim 11, wherein the processing circuitry further configures the UE to:
  receive PDCCHs that schedule time-overlapped PDSCHs, the PDCCHs associated to different CORESETs having different CORESET Pool Index values; and
  transmit a PUCCH containing HARQ-ACK information bits that are concatenated based on the coreset pool index.

* * * * *